United States Patent
Li (10) Patent No.: US 12,052,660 B2
(45) Date of Patent: Jul. 30, 2024

(54) CELL SELECTION IN MULTIPLE FREQUENCIES COMMUNICATION NETWORK

(71) Applicant: NOKIA SOLUTIONS AND NETWORKS OY, Espoo (FI)

(72) Inventor: Zhihang Li, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 351 days.

(21) Appl. No.: 17/603,693

(22) PCT Filed: Apr. 15, 2019

(86) PCT No.: PCT/CN2019/082761
§ 371 (c)(1),
(2) Date: Oct. 14, 2021

(87) PCT Pub. No.: WO2020/210957
PCT Pub. Date: Oct. 22, 2020

(65) Prior Publication Data
US 2022/0303885 A1 Sep. 22, 2022

(51) Int. Cl.
*H04W 48/18* (2009.01)
*H04W 24/02* (2009.01)

(52) U.S. Cl.
CPC ........... *H04W 48/18* (2013.01); *H04W 24/02* (2013.01)

(58) Field of Classification Search
CPC ..... H04W 48/18; H04W 24/02; H04B 17/318
USPC ....................................................... 455/434
See application file for complete search history.

(56) References Cited

U.S. PATENT DOCUMENTS

| | | | |
|---|---|---|---|
| 2007/0105583 | A1 | 5/2007 | Gerlach |
| 2015/0195737 | A1 | 7/2015 | Tabet et al. |
| 2016/0323789 | A1* | 11/2016 | Narayanan ............ H04W 48/18 |
| 2018/0035342 | A1* | 2/2018 | Fujishiro ........... H04W 36/0085 |

(Continued)

FOREIGN PATENT DOCUMENTS

| | | |
|---|---|---|
| CN | 1984430 A | 6/2007 |
| CN | 103516449 A | 1/2014 |
| CN | 104780564 A | 7/2015 |

(Continued)

OTHER PUBLICATIONS

"3rd Generation Partnership Project; Technical Specification Group Radio Access Network; Study on channel model for frequencies from 0.5 to 100 GHz (Release 15)", 3GPP TS 38.901 v15.0.0, (Jun. 2018), 91 pages.

(Continued)

*Primary Examiner* — Don N Vo
(74) *Attorney, Agent, or Firm* — ALSTON & BIRD LLP (57) ABSTRACT

Embodiments of the present disclosure relate to cell selection in a multiple frequencies communication network. A network device receives, from terminal devices, signal reception quality measurements for a set of cells at serving frequencies of the network device. The network device updates, based on the measurements, serving cells in the set for the terminal devices in such a way that a total throughput of the network device is maximized and a cell edge throughput of the network device exceeds a threshold throughput. The network device transmits information about the updated serving cells to the terminal devices for access by the terminal devices.

18 Claims, 7 Drawing Sheets

(56) References Cited

U.S. PATENT DOCUMENTS

2019/0021049 A1\* 1/2019 Martin ................. H04W 48/20
2022/0303885 A1 9/2022 Li

FOREIGN PATENT DOCUMENTS

| CN | 106034326 A | 10/2016 |
| CN | 113796127 A | 12/2021 |
| EP | 2 391 153 A1 | 11/2011 |
| WO | WO 2016/186742 A1 | 11/2016 |

OTHER PUBLICATIONS

International Search Report and Written Opinion for Patent Cooperation Treaty Application No. PCT/CN2019/082761 dated Jan. 16, 2020, 9 pages.
CHTTL, "Effect of Range Expansion in Macro-Pico Downlink", 3GPP TSG-RAN WG1 #62bis Meeting, R1-105690, (Oct. 11-15, 2010), 6 pages.
Daeinabi et al., "Survey of Intercell Interference Mitigation Techniques in LTE Downlink Networks", Australasian Telecommunication Networks and Applications Conference (ATNAC), (Dec. 31, 2012), 6 pages.
Extended European Search Report for European Application No. 19924913.7 dated Oct. 28, 2022, 10 pages.
Office Action for Chinese Application No. 201980095452.3 dated Oct. 26, 2022, 12 pages.

\* cited by examiner

CELL SELECTION IN MULTIPLE FREQUENCIES COMMUNICATION NETWORK

CROSS-REFERENCE TO RELATED APPLICATIONS

This application is a national phase entry of International Application No. PCT/CN2019/082761, filed Apr. 15, 2019, the entire contents of which are incorporated herein by reference.

FIELD

Embodiments of the present disclosure generally relate to the field of telecommunication and in particular, to a method, device, apparatus and computer readable storage medium for cell selection in a multiple frequencies communication network.

BACKGROUND

Since orthogonal frequency division multiplexing (OFDM) and multiple-input multiple-output (MIMO) techniques are utilized, new radio (NR) networks can obtain high spectral efficiency and data rate. As populations grow and demands of high data rate are increased, a single frequency network cannot provide satisfied services. Future networks may deploy multiple frequencies in order to support seamless coverage and various services. However, how to choose suitable cells in a multiple frequencies network for access by terminal devices is crucial for the terminal devices. If a terminal device selects a cell which is congested cell or contains ill conditioned channels, the terminal device may suffer a low throughput and cannot be satisfied with pre-defined quality of service (QoS) requirement.

SUMMARY

In general, example embodiments of the present disclosure provide a solution for cell selection in a multiple frequencies communication network.

In a first aspect, there is provided a network device. The network device comprises at least one processor; and at least one memory including computer program codes; the at least one memory and the computer program codes are configured to, with the at least one processor, cause the network device to receive, from terminal devices, signal reception quality measurements for a set of cells at serving frequencies of the network device; update, based on the measurements, serving cells in the set for the terminal devices in such a way that a total throughput of the network device is maximized and a cell edge throughput of the network device exceeds a threshold throughput; and transmit information about the updated serving cells to the terminal devices for access by the terminal devices.

In some example embodiments, the network device is caused to update the serving cells by iteratively performing the following for a predetermined number of times: changing a serving cell at a first serving frequency for a first terminal device of the terminal devices to a serving cell at a second serving frequency based on a subset of the measurements that is received from the first terminal device; determining the total throughput and the cell edge throughput based on the measurements and information about the serving cells; in response to a variation of the total throughput exceeding zero and the cell edge throughput exceeding the threshold throughput, updating the total throughput and the serving cells; and in response to the variation of the total throughput being below zero and the cell edge throughput exceeding the threshold throughput, updating the total throughput and the serving cells in a probability associated with the variation.

In some example embodiments, the iteratively performing further comprises: randomly selecting the first terminal device from the terminal devices; and randomly selecting the second serving frequency from the serving frequencies of the network device.

In some example embodiments, the network device is configured as a co-site network device.

In some example embodiments, the network device is caused to receive the signal reception quality measurements by: receiving a subset of the signal reception quality measurements for a first subset of the cells from the first terminal device, the first subset comprising cells having partial overlapping coverage, the number of the cells in the first subset being equal to the number of the serving frequencies.

In some example embodiments, the network device is caused to transmit the information about the updated serving cells by transmitting identifiers of the updated serving cells in association with the serving frequencies.

In a second aspect, there is provided a method for communications. The method comprises: receiving, from terminal devices, signal reception quality measurements for a set of cells at serving frequencies of the network device; updating, based on the measurements, serving cells in the set for the terminal devices in such a way that a total throughput of the network device is maximized and a cell edge throughput of the network device exceeds a threshold throughput; and transmitting information about the updated serving cells to the terminal devices for access by the terminal devices.

In a third aspect, there is provided an apparatus for communications. The apparatus comprises: means for receiving, from terminal devices, signal reception quality measurements for a set of cells at serving frequencies of the network device; means for updating, based on the measurements, serving cells in the set for the terminal devices in such a way that a total throughput of the network device is maximized and a cell edge throughput of the network device exceeds a threshold throughput; and means for transmitting information about the updated serving cells to the terminal devices for access by the terminal devices.

In a fourth aspect, there is provided a non-transitory computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Traditional solutions for cell selection are based on some simple criteria. One of the traditional solutions is based on the maximal Reference Signal Receiving Power (RSRP) algorithm. Hereinafter, the maximal Reference Signal Receiving Power algorithm is also referred to as the maximal RSRP algorithm or MR algorithm. According to the MR algorithm, every terminal device measures the RSRP of all cells and frequencies of a network device, and selects a serving cell and a frequency with the maximal RSRP. Since a higher frequency always has larger path loss compared to a lower frequency, the terminal device may usually choose a low frequency to access. The MR algorithm will result in that a large portion of terminal devices access a few of cells at lower frequencies. This will deteriorate a total throughput and a cell edge throughput due to lack of resources on these lower frequencies, while plenty of resources are spared at higher frequencies.

Another traditional solution for cell selection is based on the maximal fairness (MF) algorithm. According to the MF algorithm, a terminal device randomly chooses a cell at a frequency to access. Since lack of consideration of channel conditions of the terminal device, the terminal device may choose a cell at a frequency which has poor channel conditions. As a result, the terminal device may consume plenty resources to support its QoS requirement.

According to embodiments of the present disclosure, there is providing a solution for cell selection in a multiple frequencies communication network. A network device receives, from terminal devices, signal reception quality measurements for a set of cells at serving frequencies of the network device. Based on the measurements, the network device selects serving cells in the set for the terminal devices in such a way that a total throughput of the network device is maximized and a cell edge throughput of the network device exceeds a threshold throughput. Upon selection, the network device transmits information about the selected serving cells to the terminal devices for access by the terminal devices. As such, it is possible to maximize the total throughput of the network device without deteriorating the cell edge throughput of the network device.

Figure 1:
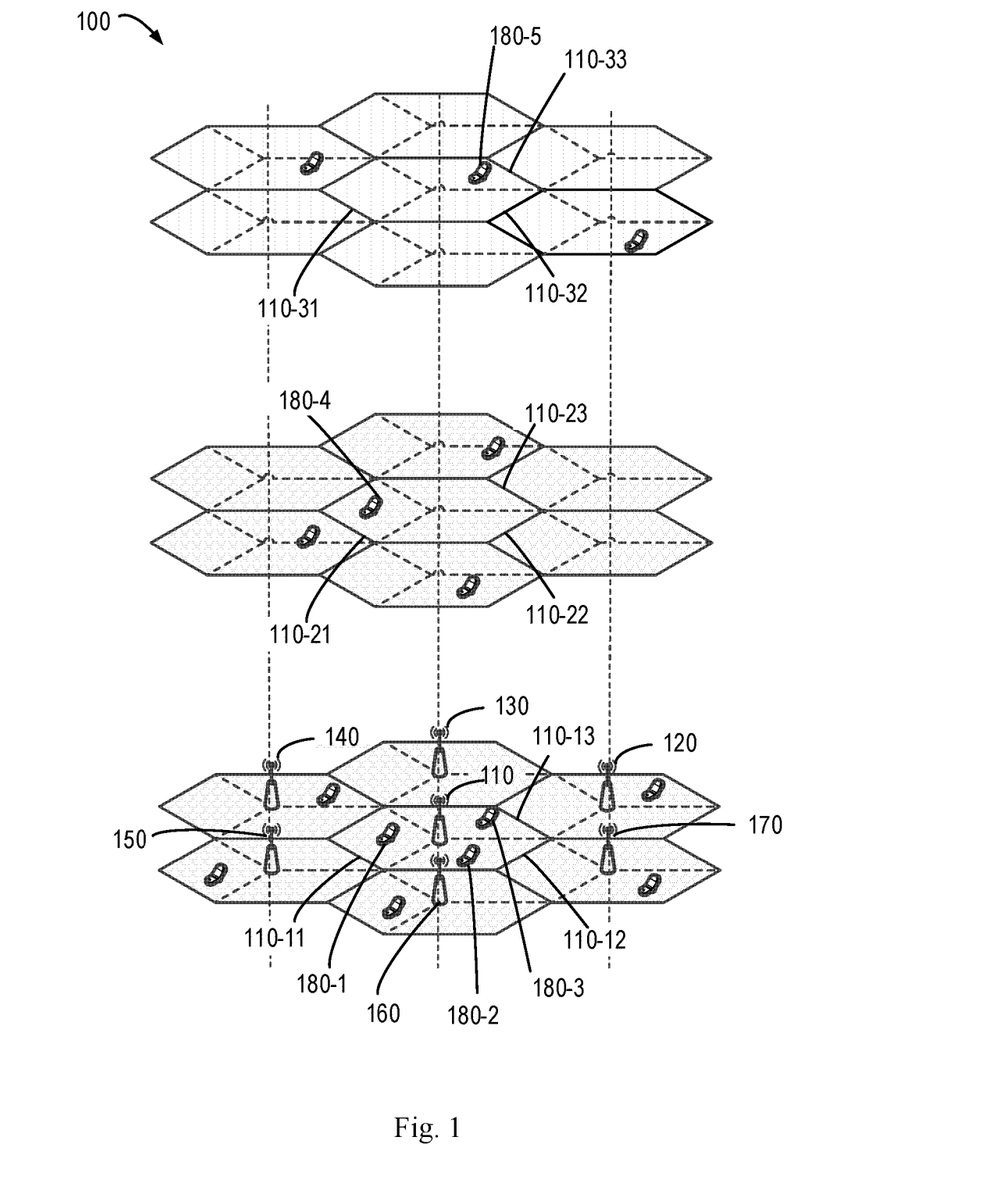
FIG. 1 illustrates an example communication network in which embodiments of the present disclosure may be implemented.

Principle and embodiments of the present disclosure will be described in detail below with reference to the accompanying drawings. Reference is first made to FIG. 1, which illustrates an example communication network 100 in which embodiments of the present disclosure may be implemented. The network 100 includes a plurality of network devices, such as network devices 110, 120, 130, 140, 150, 160 and 170.

The network devices 110 to 170 each may use a set of serving frequencies to serve terminal devices in respective coverage areas (which are also called as cells). The set of serving frequencies may include any number of serving frequencies. Hereinafter, embodiments of the present disclosure will be described by taking three serving frequencies for example. In such an example, the set of serving frequencies may include a first serving frequency (represented by f1), a second serving frequency (represented by f2) and a third serving frequency (represented by f3). The first, second and third serving frequencies are different from one another. For example, the network device 110 may use the first serving frequency f1 to serve terminal devices in cells 110-11, 110-12 and 110-13, the second serving frequency f2 to serve terminal devices in cells 110-21, 110-22 and 110-23, the third serving frequency f3 to serve terminal devices in cells 110-31, 110-32 and 110-33.

The network 100 also includes a plurality of terminal devices, such as terminal devices 180-1, 180-2, 180-3, 180-4 and 180-5, which are collectively referred to as terminal devices 180. When the terminal devices initially access the network 100, the terminal devices carry out cell search and select one of the searched cells to access. In the example as shown in FIG. 1, the terminal devices 180-1, 180-2 and 180-3 select the cells 110-11, 110-12 and 110-13 to access respectively, and the terminal devices 180-4 and 180-5 select the cells 110-21 and 110-33 to access respectively. In some example embodiments, when initially accessing the network 100, the terminal devices 180 may select the cells to access based on any known algorithm, such as the MR algorithm or the MF algorithm.

To support update of serving cells according to embodiments of the present disclosure, upon initially accessing the network 100, the terminal devices 180 may measure signal reception quality for all cells at the serving frequencies f1, f2 and f3. In turn, the terminal devices 180 transmit signal reception quality measurements to the network device 110.

Upon reception of the signal reception quality measurements, the network device 110 update serving cells for the terminal devices 180 based on the measurements in such a way that a total throughput of the network device 110 is maximized and a cell edge throughput of the network device 110 exceeds a threshold throughput. Upon update of the serving cells, the network device 110 transmits information about the updated serving cells to the terminal devices 180 for access by the terminal devices 180.

It is to be understood that the number of network devices, the number of terminal devices, and the number of serving frequencies are only for the purpose of illustration without suggesting any limitations. The network 100 may include any suitable number of network devices and terminal devices adapted for implementing embodiments of the present disclosure. The network devices may employ any suitable number of serving frequencies to serve the terminal devices.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

For the purpose of illustration, FIG. 1 shows that coverage of the cells 110-11, 110-12, 110-13, 110-21, 110-22, 110-23, 110-31, 110-32, 110-33 of the network device 110 is entirely overlapped. However, it is to be understood that the coverage of the cells of the network device 110 may vary from one serving frequency to another due to more serious path-loss at a higher serving frequency. For example, the coverage of the cells at different serving frequencies of the network device 110 may partially overlapped.

Figure 2:
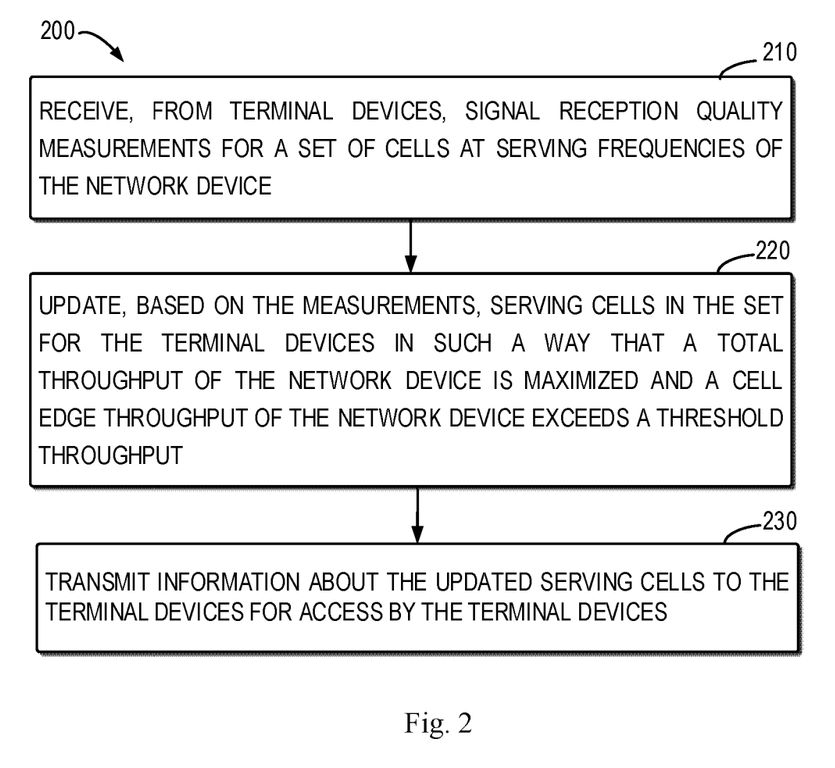
FIG. 2 illustrates a flowchart of a method implemented at a network device according to some embodiments of the present disclosure.

Reference is now made to FIG. 2, which shows a flowchart of a method 200 for cell selection according to an embodiment of the present disclosure. For the purpose of discussion, the method 200 will be described with reference to FIG. 1. The method 200 may involve the network device 110 and the terminal devices 180 as illustrated in FIG. 1. It would be appreciated that although the method 200 will be described with respect to the network device 110 in FIG. 1, this method may be likewise applied to other network devices which employ multiple serving frequencies. For example, the method 200 may be applied to any of the network devices 120 to 170 in FIG. 1.

At block 210, the network device 110 receives, from the terminal devices 180, signal reception quality measurements for a set of cells at serving frequencies of the network device 110. In some example embodiments, examples of the signal reception quality measurements may include, but are not limited to, RSRP and signal to interference and noise ratio (SINR).

For easy of discussion, consider an example. In the example, it is assumed that the frequency reuse factor is 1, the network device 110 uses single user MIMO, and only inter-cell interference is considered. The set of serving frequencies is represented by F and the set F includes the first, second and third serving frequencies f1, f2 and f3. The serving cell set at one serving frequency is represented by N. For example, the serving cell set at the first serving frequency f1 includes all cells at the first serving frequency f1 that are provided by the network devices 110 to 170.

It is also assumed that each of the terminal devices 180 can only access one cell at one frequency at once. A cell selection indicator of a terminal device m in a cell n at a serving frequency f may be represented by $$I_{m,n}^{f} = \begin{cases} 1, & UE\ m\ \text{access cell}\ n\ \text{at frequency}\ f \\ 0, & \text{otherwise} \end{cases} \quad (1)$$

where m represents a sequence number of any of the terminal devices 180, n represents a sequence number of any of the cells 110-11, 110-12, 110-13, 110-21, 110-22, 110-23, 110-31, 110-32, 110-33 of the network device 110. For example, the terminal devices 180-1 to 180-5 may be assigned with sequence numbers 1, 2, . . . , 5 respectively, and the cells 110-11, 110-12, 110-13 at the first serving frequency f1 may be assigned with sequence numbers 1, 2, 3 respectively. Similarly, the cells 110-21, 110-22, 110-23 at the second serving frequency f2 may be assigned with sequence numbers 1, 2, 3 respectively, and the cells 110-31, 110-32, 110-33 at the third serving frequency f3 may be assigned with sequence numbers 1, 2, 3 respectively. In some example embodiments, the sequence numbers of cells may be associated with identities of the cells, such as physical layer identities of the cells.

For example, upon the initial access as shown in FIG. 1, the cell selection indicator of the terminal device 1 (i.e., the terminal device 180-1) in a cell 1 at frequency f1 may be represented by $I_{1,1}^{f1}=1$.

A set of the attached terminal devices in the cell n at the serving frequency f may be represented by $U_n^f$, which means $$U_n^f = \{m | I_{m,n}^f = 1\} \quad (2)$$

The RSRP of the terminal device m in the cell n at the serving frequency f may be represented by $$p_{m,n}^f = P_n^f \cdot |h_{m,n}^f|^2 \quad (3)$$

where $P_n^f$ represents the transmit power of the cell n at the serving frequency f, and $h_{m,n}^f$ represents the channel response of terminal device m in cell n at frequency f. $h_{m,n}^f$ may include the large scale fading (the pass loss gain, antenna array gain, shadow fading gain, penetration gain) and the small scale fading (fast fading gain), |•| represents the cardinal number of a set.

The SINR of the terminal device m in the cell n at the serving frequency f may be represented by $$\gamma_{m,n}^f = \frac{p_{m,n}^f}{\sum_{q \in N, q \neq n} p_{m,q}^f + \sigma^2} \quad (4)$$

where $\sigma^2$ represents the complex additive white Gaussian noise power.

In some example embodiments, the terminal devices 180 may determine, based on the above Equation (4), SINRs for all cells at each of the serving frequencies of the current serving network device 110. For each of the serving frequencies, the terminal devices 180 may select the SINR for at least one of all cells at the corresponding serving frequency depending on the locations of the terminal devices 180 in the cells.

For example, take the terminal device 180-1 that is located in the center of the cell 110-11 for example. For each of the serving frequencies, the terminal device 180-1 may select the maximal SINR for one of all cells at the corresponding serving frequency. For example, as shown, the terminal device 180-1 is located in the center of the cell 110-11.

The terminal device 180-1 may determine the SINR in the cell 110-11 (represented by $\gamma_{1,1}^{f1}$) as the maximal SINR in all cells at the first serving frequency f1. In addition, the terminal device 180-1 may determine the SINR in the cell 110-21 (represented by $\gamma_{1,1}^{f2}$) as the maximal SINR in all cells at the second serving frequency f2, and the SINR in the cell 110-31 (represented by $\gamma_{1,1}^{f3}$) as the maximal SINR in all cells at the third serving frequency f3. Then, the terminal device 180-1 may transmit the SINRs $\gamma_{1,1}^{f1}$, $\gamma_{1,1}^{f2}$ and $\gamma_{1,1}^{f3}$ to the network device 110 as the signal reception quality measurements.

For another example, take the terminal device 180-3 that is located at the edge of the cell 110-13 for example. For each of the serving frequencies, the terminal device 180-3 may select an SINR in the cell 110-13, an SINR in a neighbor cell provided by the network device 120, and an SINR in a neighbor cell provided by the network device 130. Then, the terminal device 180-3 may transmit the three selected SINRs to the network device 110.

In some example embodiments, the terminal devices 180 may transmit the signal reception quality measurements in association with information about the cells associated with the measurements. For example, the terminal devices 180 may transmit the SINRs in association with the cell selection indicators of the terminal devices 180. For example, the terminal device 180-1 may transmit the SINRs $\gamma_{1,1}^{f1}$, $\gamma_{1,1}^{f2}$ and $\gamma_{1,1}^{f3}$ in association with the cell selection indicators $I_{1,1}^{f1}$, $I_{1,1}^{f2}$ and $I_{1,1}^{f3}$ having a value of 1.

Upon receiving the signal reception quality measurements from the terminal devices 180, the network device 110 may determine a total throughput of the network device 110 and a cell edge throughput of the network device 110 based on the signal reception quality measurements.

For the purpose of determining the total throughput and the cell edge throughput, the network device 110 may determine data rates of the terminal devices 180. In this example, if it is assumed that adaptive coding and modulation is used to achieve the Shannon rate limit and the total available resources of the cell n at the serving frequency f is represented by $S_n^f$, a data rate of the terminal device m in the cell n at the serving frequency f may be represented by $$R_m = R_{m,n}^f = \lfloor S_n^f / U_n^f \rfloor \cdot \log_2(1 + I_{m,n}^f \cdot \gamma_{m,n}^f) \tag{5}$$

where $\lfloor x \rfloor$ represents the largest integer number less than x.

The total throughput of the network device 110 may be represented by $$R_T = \sum_{f=1}^{F} \sum_{n=1}^{N} \sum_{m=1}^{U_n^f} R_m \tag{6}$$

The cell edge throughput of the network device 110 may be defined as the sum of the lowest 5% terminal device throughput, and may be represented by $R_C$:

$$R_C = \sum_{m=1}^{V} R_m \tag{7}$$

where V represents a set of terminal devices at the cell edge, which follows $|V| \leq 0.05 \cdot \sum_{f=1}^{F} \sum_{n=1}^{N} |U_n^f|$ and may be defined as $$V = \{m | m \in \hat{R}\} \tag{8}$$

where $\hat{R} = \text{sort}(\{R_m | f \in F, n \in N, m \in U_n^f\} \text{ascend})$.

Referring back to FIG. 2, at block 220, the network device 110 updates, based on the measurements, serving cells for the terminal devices 180 in such a way that the total throughput of the network device 110 is maximized and the cell edge throughput of the network device 110 exceeds a threshold throughput.

In some example embodiments, the network device 110 may update the serving cells for the terminal devices 180 based on an improved simulated annealing (ISA) algorithm that is proposed in the present disclosure, which will be described later with reference to FIG. 3. With the ISA algorithm, an optimization goal is to maximize the total throughput without deteriorating the cell edge throughput. The optimization goal may be represented by $$(P1) \max\{R_T\} \tag{9}$$

$$s.t. R_C \geq R_C^{MR} \tag{10}$$

where $R_C^{MR}$ represents the cell edge throughput determined based on the MR algorithm.

Traditional simulated annealing (SA) algorithm was first proposed by Kirkpatrick et al. The concept of the traditional SA is inspired by annealing process in metallurgy, which is a technique involving molecules thermal motion and controlled cooling process of a material. During the cooling process, the thermodynamic free energy of the material decreases gradually. While at any given temperature, the thermodynamic free energy of the material can increase at a probability due to molecules thermal motion. Such probability follows the Metropolis rule, which decrease as the decrease of the temperature of the material. After the annealing process, when the temperature reaches the final temperature, the thermodynamic free energy of the material will be the lowest.

The traditional SA is a classical unsupervised optimal algorithm, which can get the optimal solution of a problem at the probability of 1 relying on the Metropolis rule. However, the traditional SA is designed for solving single-variable problems, while (P1) is a multiple-variables problem, in which each variable represents a cell selection decision for a terminal device.

Figure 3:
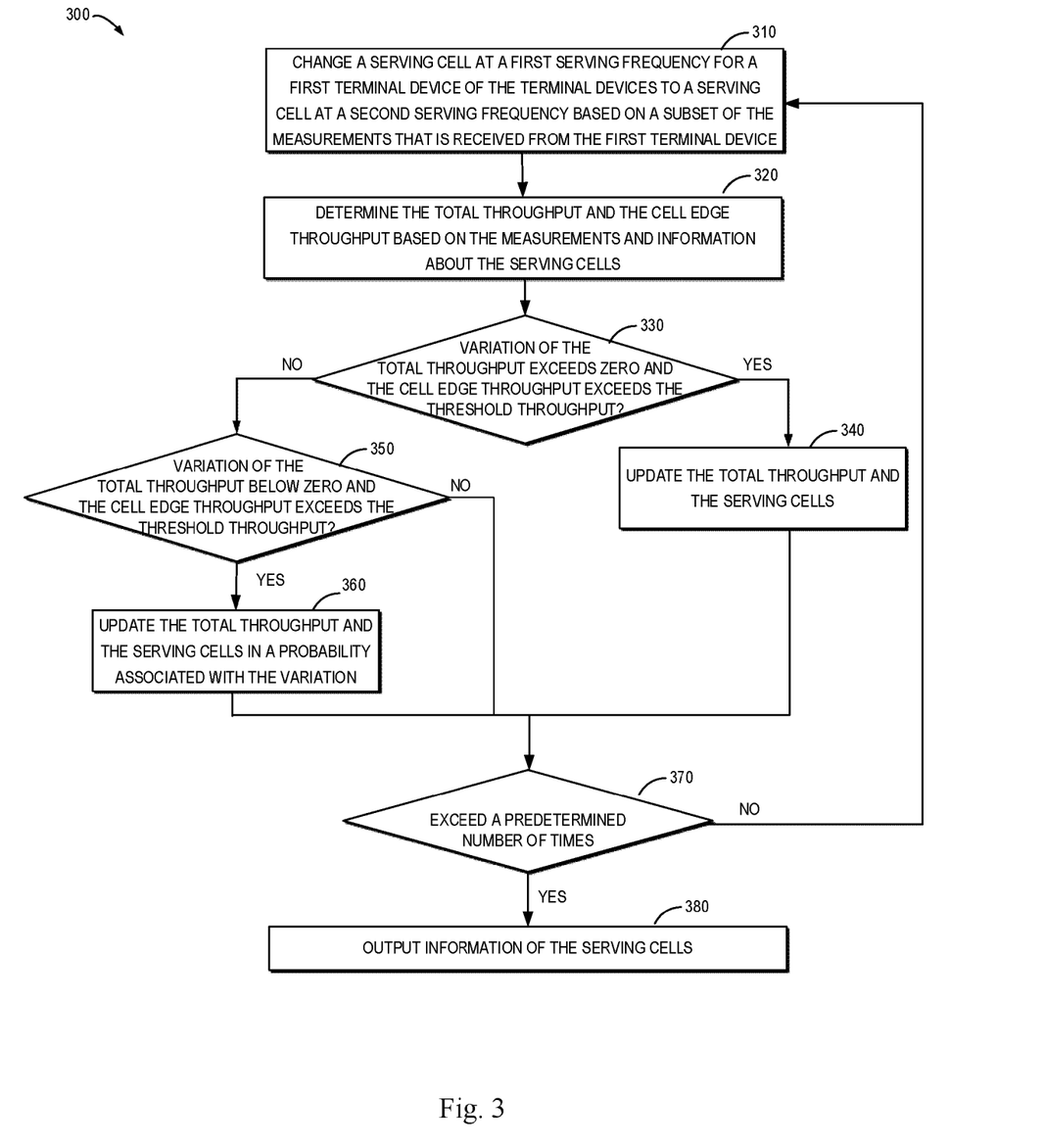
FIG. 3 illustrates a flowchart of a method implemented at a network device according to some other embodiments of the present disclosure.

FIG. 3 shows a flowchart of an example method 300 implemented at a network device in accordance with some embodiments of the present disclosure. For the purpose of discussion, the method 300 will be described from the perspective of the network device 110 with reference to FIG. 1. The method 300 may be considered as an example implementation of the step 220 in FIG. 2.

As discussed above, when initially accessing the network 100, the terminal devices 180 may select serving cells to access based on the MR algorithm or the MF algorithm. The network device 110 may take current cell selection decision for all terminal devices (for example, the terminal devices 180) as the optimal solution of (P1), the current cell selection decision may be represented by $$I^* = \{I_{m,n}^f | \forall f \in F, \forall n \in N, \forall m \in U_n^f\} \tag{11}$$

Accordingly, the network device 110 may determine a current total throughput and a current cell edge throughput (represented by $R_C^{MR}$) based on the current cell selection decision and signal reception quality measurements. In some example embodiments, the network device 110 may determine the current total throughput and the current cell edge throughput according to the above Equations (6) and (7). In addition, the network device 110 may take the current total throughput as the optimal total throughput (represented by $R^*_T$), and the current cell edge throughput as the optimal cell edge throughput (represented by $R^*_C$).

In some example embodiments, the network device 110 may update the selected serving cells for the terminal devices 180 and the optimal total throughput $R_T^*$ by performing the method 300.

At block 310, the network device 110 changes a serving cell at a serving frequency for a first terminal device of the terminal devices 180 to a serving cell at a further serving frequency based on a subset of the signal reception quality measurements that is received from the first terminal device. It may be understood that if the serving cell for the first terminal device is changed, the cell selection decision for all of the terminal devices 180 may be changed to a new cell selection decision (represented by $\hat{I}$).

In some example embodiments, the network device 110 may randomly select the first terminal device from the terminal devices 180. In addition, the network device 110 may randomly select the further serving frequency from the serving frequencies of the network device 110.

At block 320, the network device 110 determines a new total throughput (represented by $\hat{R}_T$) and a new cell edge throughput (represented by $\hat{R}_C$) based on the measurements and information about the serving cells for the terminal devices 180. For example, the network device 110 may determine the information about the serving cells based on the current cell selection decision I*. In some example embodiments, the network device 110 may determine the new total throughput $\hat{R}_T$ and the new cell edge throughput $\hat{R}_C$ according to the above Equations (6) and (7).

At block 330, the network device 110 determines whether a variation of the total throughput exceeds zero and the cell edge throughput exceeds the threshold throughput. In other words, the network device 110 determines whether the new total throughput $\hat{R}_T$ exceeds the optimal total throughput $R_T^*$ and the new cell edge throughput $\hat{R}_C$ exceeds the cell edge throughput $R_C^{MR}$.

If the network device 110 determines at block 330 that the new total throughput $\hat{R}_T$ exceeds the optimal total throughput $R_T^*$ and the new cell edge throughput $\hat{R}_C$ exceeds the cell edge throughput $R_C^{MR}$, the network device 110 updates at block 340 the optimal total throughput $R_T^*$ with the new total throughput $\hat{R}_T$ and updates the serving cells. For example, the network device 110 may update the serving cells by updating the current cell selection decision I* with the new cell selection decision $\hat{I}$.

On the other hand, if the network device 110 determines at block 330 that the new total throughput $\hat{R}_T$ does not exceed the optimal total throughput $R_T^*$ but the new cell edge throughput $\hat{R}_C$ exceeds the cell edge throughput $R_C^{MR}$, the network device 110 determines at block 350 whether the variation of the total throughput is below zero and the cell edge throughput exceeds the threshold throughput. In other words, the network device 110 determines at block 350 whether the new total throughput $\hat{R}_T$ does not exceed the optimal total throughput $R_T^*$ but the new cell edge throughput $\hat{R}_C$ exceeds the cell edge throughput $R_C^{MR}$.

If the network device 110 determines at block 350 that the new total throughput $\hat{R}_T$ does not exceed the optimal total throughput $R_T^*$ but the new cell edge throughput $\hat{R}_C$ exceeds the cell edge throughput $R_C^{MR}$, the network device 110 update at block 360 the total throughput and the serving cells in a probability associated with the variation.

In some example embodiments, the probability may be determined based on the below Equation (12):

$$\delta = \exp[(\hat{R}_T - R_T^*)/T] \quad (12)$$

where $\delta$ represents the probability, T represents the current temperature and may be an integer.

In some example embodiments, the network device 110 may generate a number $\alpha \in [0,1]$ which follows the uniform distribution. If the network device 110 determines whether $\alpha \leq \delta$, the network device 110 updates the optimal total throughput $R_T^*$ with the new total throughput $\hat{R}_T$ and updates the optimal cell selection decision I* with the new cell selection decision $\hat{I}$.

On the other hand, if the network device 110 determines at block 350 that the new total throughput $\hat{R}_T$ does not exceed the optimal total throughput $R_T^*$ but the new cell edge throughput $\hat{R}_C$ exceeds the cell edge throughput $R_C^{MR}$, the network device 110 determines at block 370 whether an iteration number exceeds a predetermined number of times.

If the network device 110 determines at block 370 that the iteration number exceeds a predetermined number of times, the network device 110 outputs information about the serving cells for the terminal devices 180 at block 380.

On the other hand, if the network device 110 determines at block 370 that the iteration number does not exceed the predetermined number of times, the method 300 returns to block 310.

In some example embodiments, to ensure robustness of the ISA algorithm, the network device 110 may iteratively perform the method 300 for a further predetermined number of times. In such embodiments, the following parameters may be set: an initial temperature T0, a final temperature T1, a cool down parameter d, where T0 and T1 may be integers and $d \in (0,1)$.

Example pseudo-code of the ISA algorithm according to some embodiments of the present disclosure may be constructed as the following:

| ISA algorithm |
| --- |
| Initialization: Set T0, T1, L, d to default values, let k=0; |
| 01: Let T = T0; |
| 02: Make I* as the current solution, calculate $R^*_T$ and $R^*_C$ by Equation (6) and (7); |
| 03: Let l = 0; |
| 04: Perform the acts in blocks 310 and 320. Denote the new solution as $\hat{I}$, calculate $\hat{R}_T$ and $\hat{R}_C$ by Equation (6) and (7); |
| 05: If $\hat{R}_T > R^*_T$ and $\hat{R}_C \geq R_C^{MR}$, then update I* and $R^*_T$ with $\hat{I}$ and $\hat{R}_T$. Then go to step 07, else go to step 06; |
| 06: If $\hat{R}_T \leq R^*_T$ and $\hat{R}_C \geq R_C^{MR}$, evaluate the probability according to Equation (12) and generate a number $\alpha \in [0,1]$. If $\alpha \leq \delta$, then update I* and $R^*_T$ with $\hat{I}$ and $\hat{R}_T$. Then go to step 07; |
| 07: l = l + 1. If l ≤ L, go to step 04. Else, go to step 08; |
| 08: T = T · d . If T ≥ T1, go to step 03. Else, go to step 09; |
| 09: k = k + 1. If k < K, go to step 02. Else, go to step 10; |
| 10: Get the optimal solution I* . |

In the above pseudo-code of the ISA algorithm, T0 represents an initial temperature, T1 represents a final temperature, L represents a constant temperature inner cycle evaluating times (also referred to as the predetermined number of times as described in block 370 of FIG. 3), d represents a cool down parameter and $d \in (0, 1)$.

In some other example embodiments, the network device 110 may update the serving cells for the terminal devices 180 based on an exhaustive search (ES) algorithm in such a way that the total throughput of the network device 110 is maximized and the cell edge throughput of the network device 110 exceeds a threshold throughput. According to the ES algorithm, the network device 110 evaluates all possible combinations of all terminal devices and all frequencies. Then, the network device 110 can get the optimized result which has the maximal total throughput without deteriorating the cell edge throughput.

For example, as described above, the terminal device 180-1 may transmit the SINRs $\gamma_{1,1}{}^{f1}$, $\gamma_{1,1}{}^{f2}$ and $\gamma_{1,1}{}^{f3}$ to the network device 110 as the signal reception quality measurements for the cell 110-11, 110-21 and 110-31.

In this example, the network device 110 may change the serving cell 110-11 for the terminal device 180-1 to the cell 110-21 and to the cell 110-31, respectively. In turn, the network device 110 may determine the respective total throughputs and the respective cell edge throughputs based on the above Equations (6) and (7). With respect to the other terminal devices served by the network device 110, the network device 110 may perform the similar operations. Then, the network device 110 may determine all possible combinations of the total throughputs and the cell edge throughputs for all the served terminal devices. The network device 110 may select, from all possible combinations, one maximal total throughput and one cell edge throughput that exceeds a threshold throughput. Thus, the network device 110 may determine the cell selection decision corresponding to the selected maximal total throughput and cell edge throughput as the optimal cell selection decision.

Referring back to FIG. 2, at block 230, the network device 110 transmits information about the updated serving cells to the terminal devices for access by the terminal devices 180.

In some example embodiments, the network device 110 may transmit identifiers of the updated serving cells in association with the serving frequencies.

Complexity analysis of the ES algorithm and the ISA algorithm is performed. For the ES algorithm, the computation overhead is $$O\left(|F|^{\sum_{f=1}^{F}\sum_{n=1}^{N}|U_n^f|}\right),$$

which is relative to F, N and $U_n^f$. The complexity of the ES algorithm will grow exponentially as the serving frequencies, cells, and terminal device population increase. For the ISA algorithm, the computation overhead is $O[\log_d(T1/T0) \cdot L \cdot K]$, which is only related to the predefined parameters. As the serving frequencies, cells, and terminal device population increase, the ISA algorithm can decrease the computation overhead significantly.

Since the computation overhead of the ES algorithm is $$O\left(|F|^{\sum_{f=1}^{F}\sum_{n=1}^{N}|U_n^f|}\right),$$

the performance of the ES algorithm with large F and N is not evaluated. In the analysis, F and $\sum_{f=1}^{F}\sum_{n=1}^{N}|U_n^f|$ are set to be 3 and 10, respectively.

The total throughput gain and cell edge throughput gain of the ISA algorithm to the ES algorithm are defined as $\eta_T = R_T^{ISA}/R_T^{ES}$ and $\eta_C = R_C^{ISA}/R_C^{ES}$, where $R_T^{ISA}$, $R_T^{ES}$, $R_C^{ISA}$, $R_C^{ES}$ represent the total throughput and cell edge throughput of the ISA algorithm and the ES algorithm, respectively.

Figure 4:
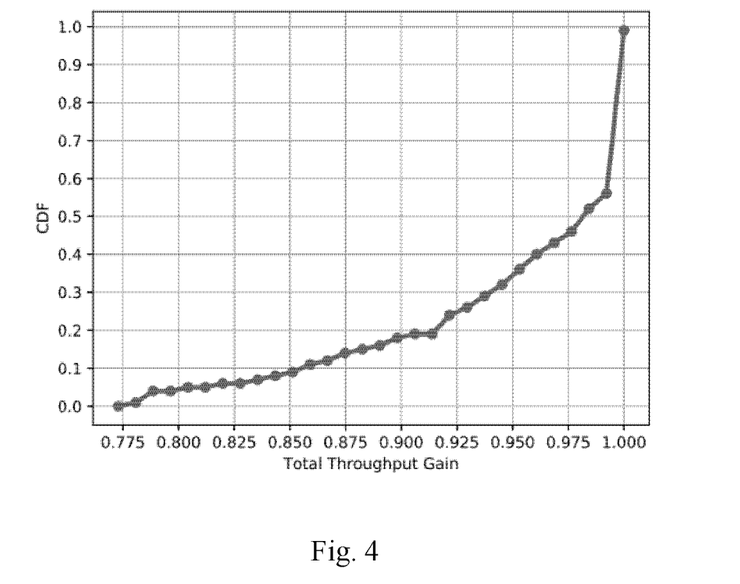
FIG. 4 is a graph illustrating optimality analysis of a total throughput according to some embodiments of the present disclosure.
Figure 5:
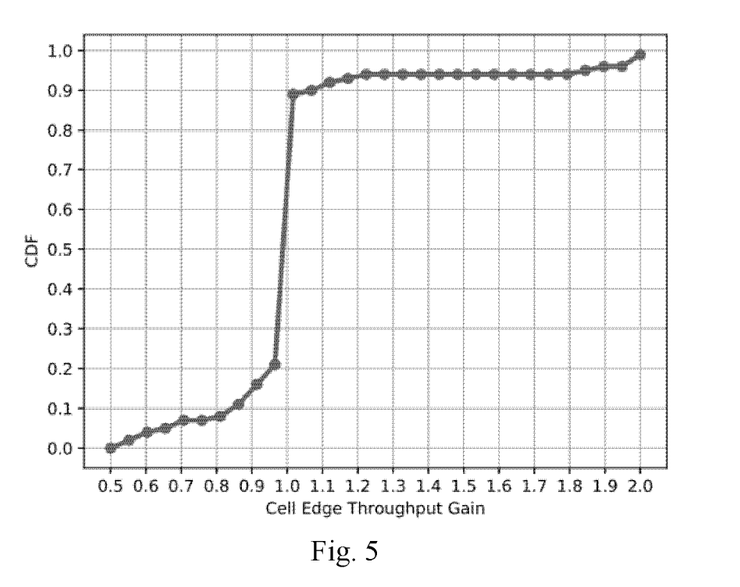
FIG. 5 is a graph illustrating optimality analysis of a cell edge throughput according to some embodiments of the present disclosure.

FIG. 4 and FIG. 5 show the cumulative distribution function (CDF) of $\eta_T$ and $\eta_C$. It can be seen that $\eta_T$ can obtain 91.7% gain in 80% cases, $\eta_C$ can obtain 97% gain in 80% cases. Hence, the ISA algorithm can obtain a similar performance to the ES algorithm, while it decreases the computation overhead significantly.

Performance evaluation of the ISA algorithm is conducted. Simulation parameters are listed in Table 1.

TABLE 1

| Parameter | Value |
| --- | --- |
| Sites | 7 |
| Cells per site | 3 |
| Inter site distance | 200 m |
| terminal devices per network device | 30 |
| F | [1, 2, . . . , 10] GHz |
| Bandwidth | 10 MHz |
| Tx power | 46 dBm |
| Noise figure | −174 dBm/Hz |
| Receive figure | 9 dB |
| network device's antenna pattern (M, N, P) | (4, 2, 2) |
| terminal device's antenna pattern (M, N, P) | (1, 1, 1) |
| (T0, T1, L, d, K) | (1, 0.01, 50, 0.99, 3) |

The network 100 considered here is shown as FIG. 1. In order to simplify the problem, only the traffic generated in one network device, for example the network device 110, is investigated. The network device 110 only provides full buffer traffic and best effort service to terminal devices. Python is used as the simulator. The inter-site interference of the same frequency consists of the adjacent six network devices. Other parameters are consistent with the simulation scenario NR-Umi recommended by 3GPP TS 38.901.

The simulation is performed as a quasi-dynamic setting, which means 100 snapshots are performed. In each snapshot, terminal devices drop uniformly in the network device 110. MR, MF, and the ISA algorithms are performed in each snapshot. The evaluation metrics are the total throughput and the cell edge throughput.

Figure 6:
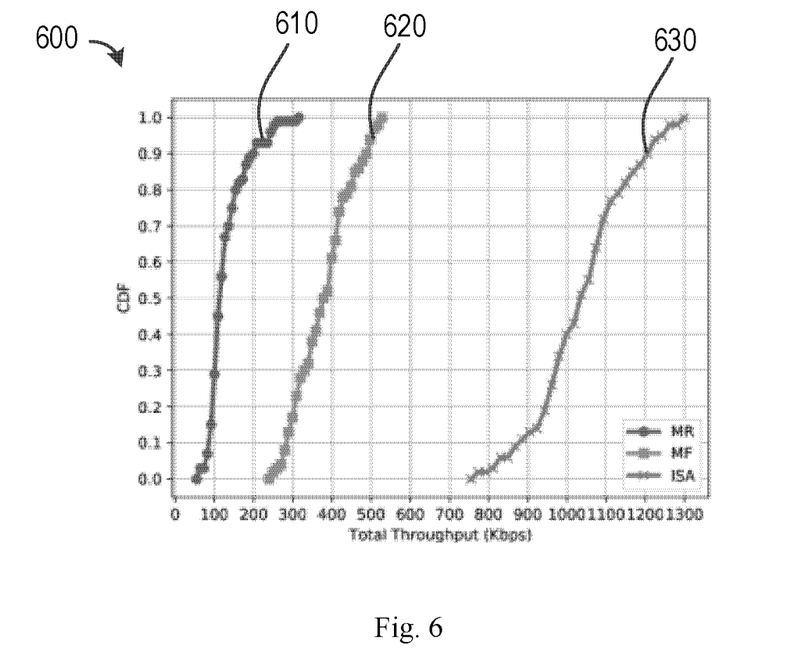
FIG. 6 is a graph illustrating performances analysis of a total throughput according to some embodiments of the present disclosure.

FIG. 6 shows total throughputs of MR, MF, and the ISA algorithms. In FIG. 6, a curve 610 represents a total throughput of MR algorithm, a curve 620 represents a total throughput of MF algorithm, and a curve 630 represents a total throughput of ISA algorithm.

As shown, MR has the worst performance because lots of terminal devices select to access cells at low frequencies. If each terminal device selects its serving frequency randomly, the spare resources of a high frequency can be utilized to increase the total throughput. The ISA algorithm outperforms than MR and MF because the ISA algorithm utilizes the channel conditions of different terminal devices and resources utilizations of different cells and frequencies. The ISA algorithm has 184.28% and 797.67% average gain compared with MF and MR algorithms, respectively.

Figure 7:
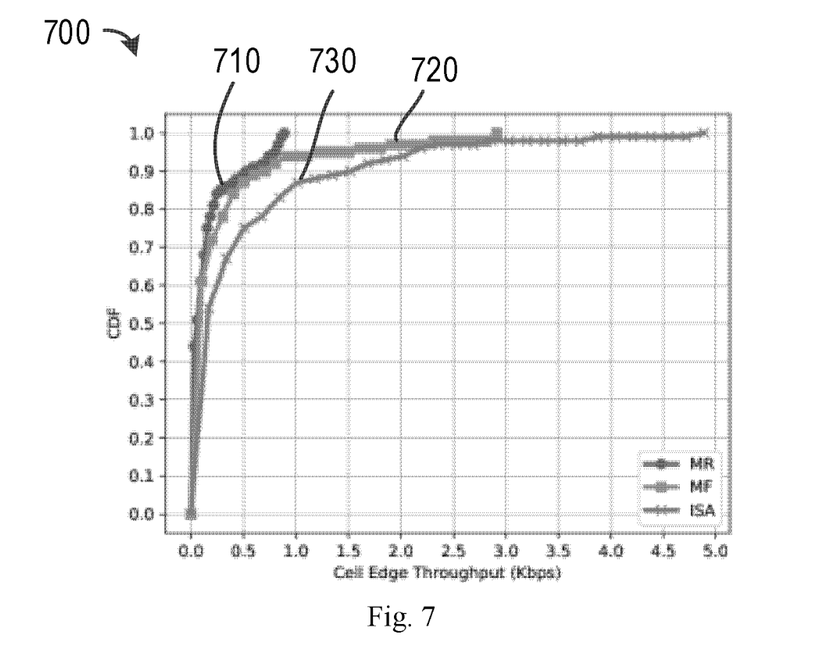
FIG. 7 is a graph illustrating performances analysis of a cell edge throughput according to some embodiments of the present disclosure.

FIG. 7 shows the cell edge throughput of MR, MF, and the ISA algorithms. In FIG. 7, a curve 710 represents a cell edge throughput of MR algorithm, a curve 720 represents a cell edge throughput of MF algorithm, and a curve 730 represents a cell edge throughput of ISA algorithm.

As shown, the ISA algorithm does not deteriorate the cell edge throughput. The ISA algorithm has 240.12% and 284.77% average gain compared with MF and MR algorithms, respectively. Thus, it may be concluded that the ISA algorithm can improve the total throughput significantly without deteriorating the cell edge throughput.

Figure 8:
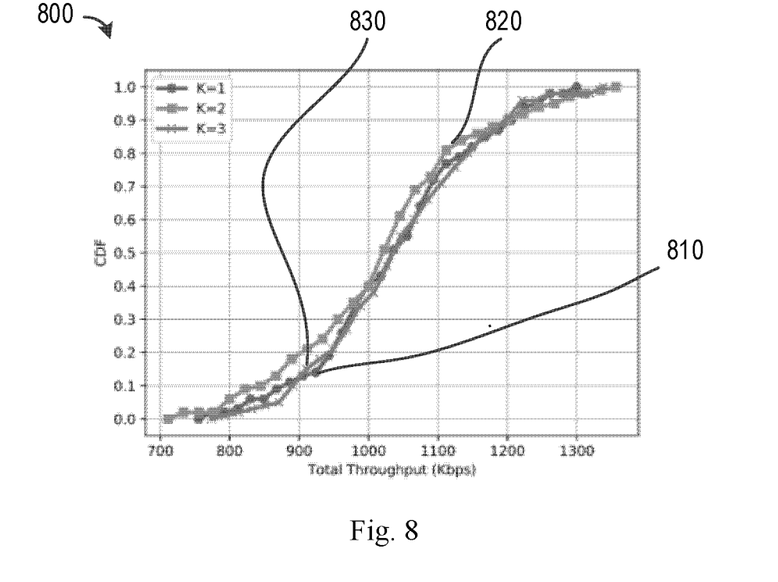
FIG. 8 is a graph illustrating stability analysis of a total throughput according to some embodiments of the present disclosure.
Figure 9:
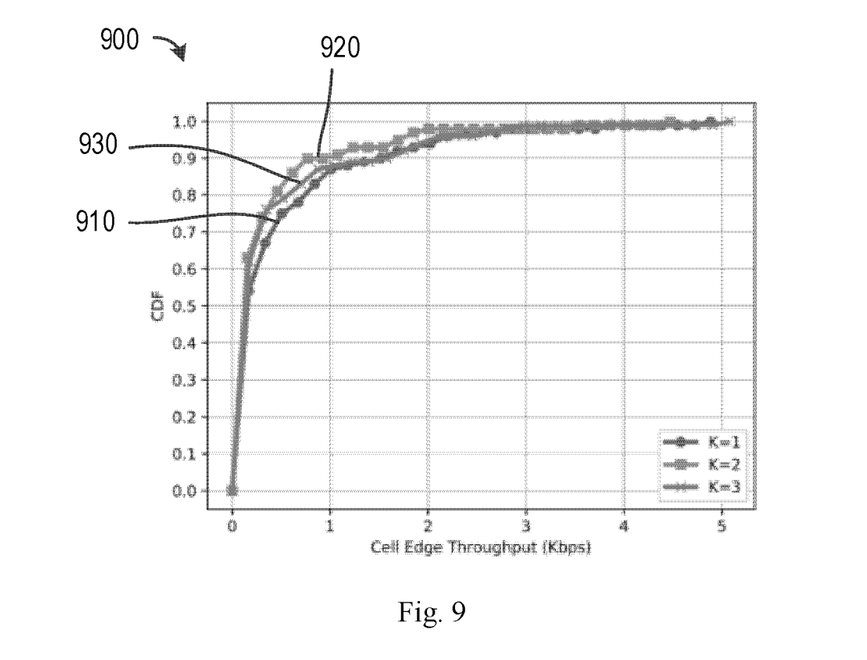
FIG. 9 is a graph illustrating stability analysis of a cell edge throughput according to some embodiments of the present disclosure.

FIG. 8 and FIG. 9 show the total throughputs and cell edge throughputs of the ISA algorithm with different values of K.

In FIG. 8, a curve 810 represents the total throughput with K having a value of 1, a curve 820 represents the total throughput with K having a value of 2, and a curve 830 represents the total throughput with K having a value of 3.

In FIG. 9, a curve 910 represents the cell edge throughput with K having a value of 1, a curve 920 represents the cell edge throughput with K having a value of 2, and a curve 930 represents the cell edge throughput with K having a value of 3.

It can be seen from that FIG. 8 and FIG. 9 that the ISA algorithm can achieve rather stable performances with different values of K.

In some example embodiments, an apparatus capable of performing any of the methods 200 and 300 (for example, the network device 110) may comprise means for performing the respective steps of the methods 200 and 300. The means may be implemented in any suitable form. For example, the means may be implemented in a circuitry or software module.

In some example embodiments, the apparatus comprises means for receiving, from terminal devices, signal reception quality measurements for a set of cells at serving frequencies of the network device; means for updating, based on the measurements, serving cells in the set for the terminal devices in such a way that a total throughput of the network device is maximized and a cell edge throughput of the network device exceeds a threshold throughput; and means for transmitting information about the updated serving cells to the terminal devices for access by the terminal devices.

In some example embodiments, the means for updating comprises means for iteratively performing the following for a predetermined number of times: changing a serving cell at a first serving frequency for a first terminal device of the terminal devices to a serving cell at a second serving frequency based on a subset of the measurements that is received from the first terminal device; determining the total throughput and the cell edge throughput based on the measurements and information about the serving cells; in response to a variation of the total throughput exceeding zero and the cell edge throughput exceeding the threshold throughput, updating the total throughput and the serving cells; and in response to the variation of the total throughput being below zero and the cell edge throughput exceeding the threshold throughput, updating the total throughput and the serving cells in a probability associated with the variation.

In some example embodiments, the means for iteratively performing further comprises: means for randomly selecting the first terminal device from the terminal devices; and means for randomly selecting the second serving frequency from the serving frequencies of the network device.

In some example embodiments, the network device is configured as a co-site network device.

In some example embodiments, the means for receiving the signal reception quality measurements comprises means for receiving a subset of the signal reception quality measurements for a first subset of the cells from the first terminal device, the first subset comprising cells having partial overlapping coverage, the number of the cells in the first subset being equal to the number of the serving frequencies.

In some example embodiments, the means for transmitting the information about the updated serving cells comprises means for transmitting identifiers of the updated serving cells in association with the serving frequencies.

Figure 10:
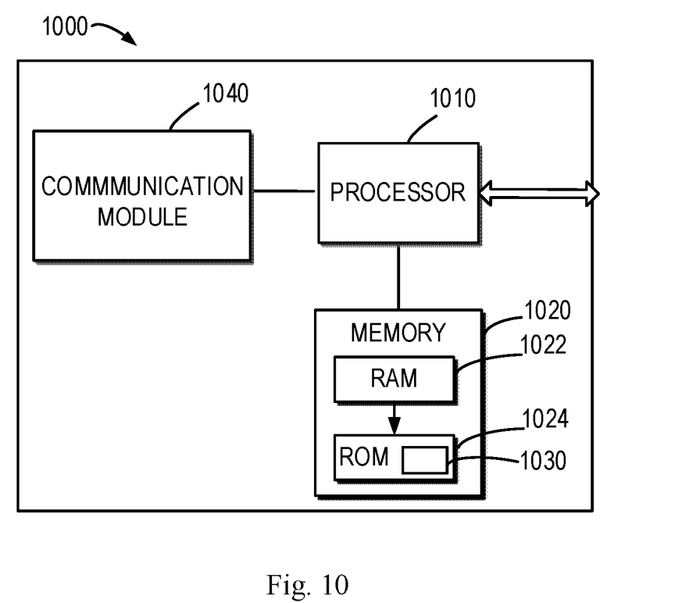
FIG. 10 illustrates a simplified block diagram of an apparatus that is suitable for implementing embodiments of the present disclosure.

FIG. 10 is a simplified block diagram of a device 1000 that is suitable for implementing embodiments of the present disclosure. The device 1000 may be provided to implement the communication device, for example any of the terminal devices 180, any of the network devices 110 to 170 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 2 to 3. The embodiments of the present disclosure may also be implemented by hardware or by a combination of software and hardware.

Figure 11:
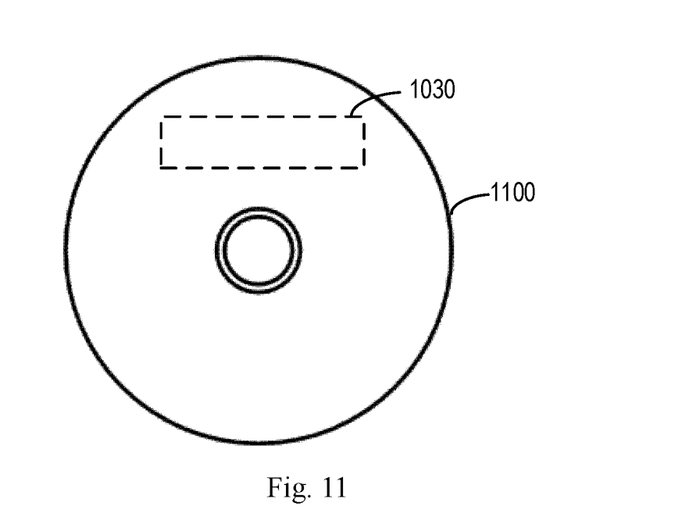
FIG. 11 illustrates a block diagram of an example computer readable medium in accordance with some embodiments of the present disclosure.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 1000 as described above with reference to FIGS. 2-3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A network device, comprising:
    at least one processor; and
    at least one memory including computer program code;
    the at least one memory and the computer program code configured to, with the at least one processor, cause the network device to:
        receive, from terminal devices, signal reception quality measurements for a set of cells at serving frequencies of the network device;
        update, based on the measurements, serving cells in the set for the terminal devices such that a total throughput of the network device is maximized and a cell edge throughput of the network device exceeds a threshold throughput; and
        transmit information about the updated serving cells to the terminal devices for access by the terminal devices.

2. The network device of claim 1, wherein the network device is caused to update the serving cells by iteratively performing the following for a predetermined number of times:
    changing a serving cell at a first serving frequency for a first terminal device of the terminal devices to a serving cell at a second serving frequency based on a subset of the measurements that is received from the first terminal device;
    determining the total throughput and the cell edge throughput based on the measurements and information about the serving cells;
    in response to a variation of the total throughput exceeding zero and the cell edge throughput exceeding the threshold throughput, updating the total throughput and the serving cells; and
    in response to the variation of the total throughput being below zero and the cell edge throughput exceeding the threshold throughput, updating the total throughput and the serving cells in a probability associated with the variation.

3. The network device of claim 2, wherein the iteratively performing further comprises:
    randomly selecting the first terminal device from the terminal devices; and
    randomly selecting the second serving frequency from the serving frequencies of the network device.

4. The network device of claim 2, wherein the network device is configured as a co-site network device.

5. The network device of claim 4, wherein the network device is caused to receive the signal reception quality measurements by:
    receiving a subset of the signal reception quality measurements for a first subset of the cells from the first terminal device, the first subset comprising cells having partial overlapping coverage, the number of the cells in the first subset being equal to the number of the serving frequencies.

6. The network device of claim 1, wherein the network device is caused to transmit the information about the updated serving cells by:
    transmitting identifiers of the updated serving cells in association with the serving frequencies.

7. A method for communications, comprising:
    receiving, from terminal devices, signal reception quality measurements for a set of cells at serving frequencies of a network device;

updating, based on the measurements, serving cells in the set for the terminal devices such that a total throughput of the network device is maximized and a cell edge throughput of the network device exceeds a threshold throughput; and transmitting information about the updated serving cells to the terminal devices for access by the terminal devices.

8. The method of claim 7, wherein the updating comprises iteratively performing the following for a predetermined number of times:

changing a serving cell at a first serving frequency for a first terminal device of the terminal devices to a serving cell at a second serving frequency based on a subset of the measurements that is received from the first terminal device;

determining the total throughput and the cell edge throughput based on the measurements and information about the serving cells;

in response to a variation of the total throughput exceeding zero and the cell edge throughput exceeding the threshold throughput, updating the total throughput and the serving cells; and in response to the variation of the total throughput being below zero and the cell edge throughput exceeding the threshold throughput, updating the total throughput and the serving cells in a probability associated with the variation.

9. The method of claim 8, wherein the iteratively performing further comprises:

randomly selecting the first terminal device from the terminal devices; and randomly selecting the second serving frequency from the serving frequencies of the network device.

10. The method of claim 8, wherein the network device is configured as a co-site network device.

11. The method of claim 10, wherein receiving the signal reception quality measurements comprises:

receiving a subset of the signal reception quality measurements for a first subset of the cells from the first terminal device, the first subset comprising cells having partial overlapping coverage, the number of the cells in the first subset being equal to the number of the serving frequencies.

12. The method of claim 7, wherein transmitting the information about the updated serving cells comprises:

transmitting identifiers of the updated serving cells in association with the serving frequencies.

13. A non-transitory computer readable medium comprising program instructions for causing an apparatus to perform at least:

receiving, from terminal devices, signal reception quality measurements for a set of cells at serving frequencies of a network device;

updating, based on the measurements, serving cells in the set for the terminal devices such that a total throughput of the network device is maximized and a cell edge throughput of the network device exceeds a threshold throughput; and transmitting information about the updated serving cells to the terminal devices for access by the terminal devices.

14. The non-transitory computer readable medium of claim 13, wherein the apparatus being caused to update the serving cells comprises the apparatus being caused to iteratively perform the following for a predetermined number of times:

changing a serving cell at a first serving frequency for a first terminal device of the terminal devices to a serving cell at a second serving frequency based on a subset of the measurements that is received from the first terminal device;

determining the total throughput and the cell edge throughput based on the measurements and information about the serving cells;

in response to a variation of the total throughput exceeding zero and the cell edge throughput exceeding the threshold throughput, updating the total throughput and the serving cells; and in response to the variation of the total throughput being below zero and the cell edge throughput exceeding the threshold throughput, updating the total throughput and the serving cells in a probability associated with the variation.

15. The non-transitory computer readable medium of claim 14, wherein the apparatus being caused to iteratively perform comprises the apparatus also being caused to:

randomly select the first terminal device from the terminal devices; and randomly select the second serving frequency from the serving frequencies of the network device.

16. The non-transitory computer readable medium of claim 14, wherein the network device is configured as a co-site network device.

17. The non-transitory computer readable medium of claim 16, wherein the apparatus being caused to receive the signal reception quality measurements comprises the apparatus being caused to:

receive a subset of the signal reception quality measurements for a first subset of the cells from the first terminal device, the first subset comprising cells having partial overlapping coverage, the number of the cells in the first subset being equal to the number of the serving frequencies.

18. The non-transitory computer readable medium of claim 13, wherein the apparatus being caused to transmit the information about the updated serving cells comprises the apparatus being caused to:

transmit identifiers of the updated serving cells in association with the serving frequencies.

* * * * *